(12) United States Patent
Beom et al.

(10) Patent No.: US 8,884,889 B2
(45) Date of Patent: Nov. 11, 2014

(54) DISPLAY DEVICE HAVING A TOUCH SCREEN PANEL AND MANUFACTURING METHOD THEREOF

(75) Inventors: Jin-Gab Beom, Yongin (KR); Shawn Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 647 days.

(21) Appl. No.: 13/067,479

(22) Filed: Jun. 3, 2011

(65) Prior Publication Data
US 2012/0105340 A1    May 3, 2012

(30) Foreign Application Priority Data
Oct. 28, 2010 (KR) .................. 10-2010-0105792

(51) Int. Cl.
*G06F 3/041* (2006.01)
(52) U.S. Cl.
CPC ..................................... *G06F 3/041* (2013.01)
USPC .......................................... 345/173; 156/291
(58) Field of Classification Search
USPC ............................... 345/173; 445/60; 156/291
See application file for complete search history.

(56) References Cited

U.S. PATENT DOCUMENTS

| | | | | |
|---|---|---|---|---|
| 6,310,614 B1 * | 10/2001 | Maeda et al. | ............... | 345/173 |
| 6,356,259 B1 * | 3/2002 | Maeda et al. | ............... | 345/173 |
| 6,522,322 B1 * | 2/2003 | Maeda et al. | ............... | 345/173 |
| 7,920,225 B2 * | 4/2011 | Nishikawa et al. | ........... | 349/60 |
| 8,635,919 B2 * | 1/2014 | Suzuki et al. | ........... | 73/862.627 |
| 2001/0000961 A1 * | 5/2001 | Hikida et al. | ............... | 345/173 |
| 2003/0201985 A1 * | 10/2003 | Katakami | .................. | 345/173 |
| 2004/0090429 A1 * | 5/2004 | Geaghan et al. | ............ | 345/173 |
| 2005/0099402 A1 * | 5/2005 | Nakanishi et al. | ........... | 345/173 |
| 2005/0110772 A1 * | 5/2005 | Kong et al. | ................... | 345/174 |
| 2009/0160819 A1 * | 6/2009 | Sasaki et al. | ................ | 345/174 |
| 2009/0303195 A1 * | 12/2009 | Yamato et al. | .............. | 345/173 |
| 2010/0033442 A1 * | 2/2010 | Kusuda et al. | .............. | 345/173 |
| 2011/0141034 A1 * | 6/2011 | Lai et al. | ..................... | 345/173 |

FOREIGN PATENT DOCUMENTS

| | | |
|---|---|---|
| KR | 10-2006-0046493 A | 5/2006 |
| KR | 10-2010-0042901 A | 4/2010 |
| KR | 10-2010-0043928 A | 4/2010 |
| KR | 10-2010-0053516 A | 5/2010 |

* cited by examiner

*Primary Examiner* — Christopher E Leiby
(74) *Attorney, Agent, or Firm* — Lee & Morse, P.C.

(57) ABSTRACT

A display device having a touch screen includes a touch screen panel defined by an active area in which an external input is sensed and a non-active area outside the active area. A display panel displays an image based on the sensing of the touch screen panel. A window covers the touch screen panel. A lower resin layer is formed on a rear surface of the touch screen panel to join the touch screen panel and the display panel to be joined together. An upper resin layer is formed on a front surface of the touch screen panel to join the touch screen panel and the window together. A lower dam or an upper dam is formed on the rear or front surface of the non-active area in the touch screen panel along a side circumference of the lower or upper resin layer, respectively.

19 Claims, 6 Drawing Sheets

DISPLAY DEVICE HAVING A TOUCH SCREEN PANEL AND MANUFACTURING METHOD THEREOF

BACKGROUND

1. Field

Embodiments relate to a display device having a touch screen panel and a manufacturing method thereof, and more particularly, to a display device having a touch screen panel and a manufacturing method thereof, which can prevent a failure due to the application of a resin layer and enhance the efficiency of a joining process.

2. Description of the Related Art

As demands on various types of display devices have recently been increased with the development of information society, studies on display devices such as a liquid crystal display device (LCD), a plasma display panel (PDP), a field emission display device (FED), an electrophoretic display device (EPD), and an organic light emitting display device (OLED) have been actively conducted.

Recently, studies have been conducted to apply a touch screen function to such display devices. A touch screen is an input device that enables a command to be input by touching a screen of a display device using an object such as a finger or pen. Since such a touch screen can replace a separate input device, e.g., a keyboard or mouse, use thereof has been increasing.

In order to incorporate a touch screen into a display device, a touch screen panel is adhered on a display panel and a window is adhered on the touch screen panel. To this end, a resin layer is used in these adhesion processes. That is, the display panel and the touch screen panel are adhered to each other by applying a resin layer therebetween, and the touch screen panel and the window are adhered to each other by applying a resin layer therebetween.

SUMMARY

Embodiments provide a display device having a touch screen and a manufacturing method thereof, which can prevent a failure due to the application of a resin layer and enhance the efficiency of a joining process.

One or more embodiments may provide a display device having a touch screen, including a touch screen panel defined by an active area in which an image is displayed on a screen and a non-active area formed at the outside of the active area so as to sense an external input, a display panel that displays an image based on the sensing of the touch screen panel, a window that covers the touch screen panel; a lower resin layer on a rear surface of the touch screen panel to join the touch screen panel and the display panel to be joined together, an upper resin layer on a front surface of the touch screen panel to join the touch screen panel and the window together, and a lower or upper dam formed on the rear or front surface of the non-active area in the touch screen panel along a side circumference of the lower or upper resin layer.

The upper dam may be formed on the front surface of the non-active area in the touch screen panel along the side circumference of the upper resin layer so as to prevent the upper resin layer from flowing outside the touch screen panel.

The upper dam may be formed of glue or silicon with a viscosity of 10000 cps or higher.

The window may include a light-shielding pattern corresponding to the non-active area, and the upper dam may be disposed to correspond to the light-shielding pattern.

The final height of the upper dam may be identical to that of the upper resin layer.

The lower dam may be formed on the rear surface of the non-active area in the touch screen panel along the side circumference of the upper resin layer so as to prevent the lower resin layer from being flowed to the outside of the touch screen panel. The width of the lower dam may be 0.2 mm.

The upper and lower dams may be made of different materials from each other.

The lower and upper resin layers may be made of the same material. The lower and upper resin layers may be formed up to the non-active area by covering the active area.

One or more embodiments may provide a manufacturing method of a display device having a touch screen, the method including: preparing a touch screen panel defined by an active area and a non-active area formed at the outside of the active area; forming a protection film in the active area on a rear surface of the touch screen panel and forming a lower dam in the non-active area on the rear surface of the touch screen panel; removing the protection film formed in the active area; forming a lower resin layer on the rear surface of the active area from the protection film is removed; and aligning the touch screen panel and a display panel so that the rear surface of the touch screen panel faces a front surface of the display panel, thereby joining the touch screen panel and the display panel together.

One or more embodiments may provide a manufacturing method of a display device having a touch screen, the method including preparing a touch screen panel defined by an active area and a non-active area formed at the outside of the active area; forming an upper dam in the non-active area on a front surface of the touch screen panel; forming an upper resin layer in the active area on the front surface of the touch screen panel; and aligning the touch screen panel and a window so that the front surface of the touch screen panel faces the window, thereby joining the touch screen panel and the window together.

The lower dam may be made of the same material as the protection film. The width of the lower dam may be 0.2 mm. The lower dam and the protection film may be formed through an ink screening process.

The upper dam may be formed of glue or silicon with a viscosity of 10000 cps or higher. The upper dam may be disposed to a light-shielding pattern formed in a non-active area of the window.

The initial height of the upper dam may be higher than the height of the upper resin layer. The final height of the upper dam may be identical to the height of the upper resin layer.

DETAILED DESCRIPTION

Figure 1A:
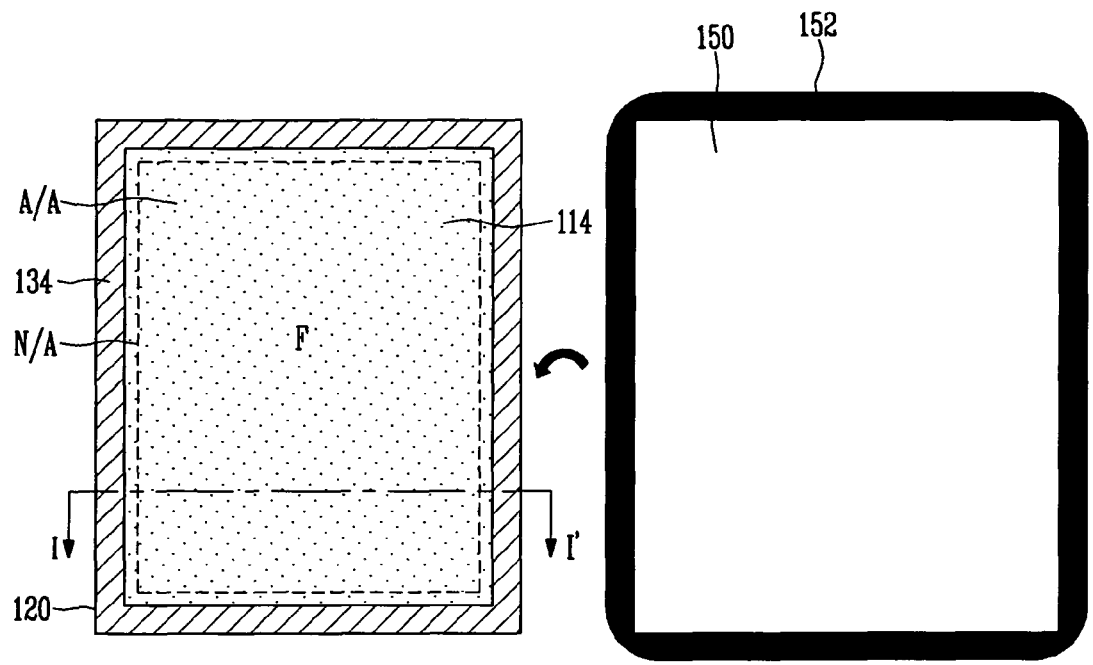
FIG. 1A is a plan view showing a top of a display device having a touch screen panel according to an embodiment.

Korean Patent Application No. 10-2010-0105792, filed on Oct. 28, 2010, in the Korean Intellectual Property Office, and entitled: "Display Device Having Touch Screen Panel and Manufacturing Method thereof" is incorporated by reference herein in its entirety.

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Shapes, sizes, rates, angles, numbers and the like, shown in the accompanying drawings, are provided only for illustrative purposes, and may be modified to some extent. Since the drawings are viewed with observer's eyes, directions or positions described in the drawings may be variously modified depending on observer's positions.

When the terms 'comprise', 'have', 'include' and the like are used, other parts may be added as long as the term 'only' is not used. The singular forms may be interpreted as the plural forms. Although the terms 'about', 'substantially' and the like are not used, shapes, comparisons between sizes, relations between positions, and the like are interpreted to include an ordinary error range. Although the terms 'after', 'before', 'subsequently', 'also', 'here', 'at this time' and the like are used, they are not used to limit temporal positions. The terms 'first', 'second', 'third' and the like are selectively, mutually or repeatedly used for distinguishing between similar elements and not used as confined meanings.

When the position relation between two parts is described using the terms 'on', 'above', 'below', 'next' and the like, one or more parts may be positioned between the two parts as long as the term 'immediately' or 'directly' is not used. When parts are linked by the term 'or', they are interpreted individually or in combination, but when they are linked by the term 'or one of', they are only interpreted individually.

Hereinafter a display device having a touch screen and a manufacturing method thereof according to embodiments described in detail with reference to the accompanying drawings.

Figure 1B:
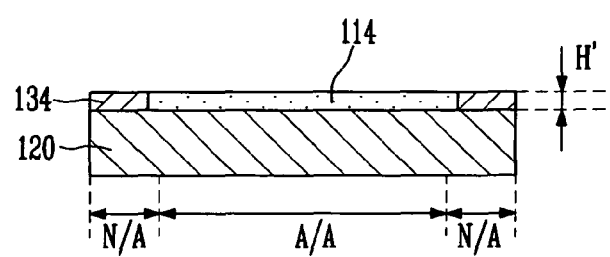
FIG. 1B is a sectional view of the touch screen panel taken along line I-I' of FIG. 1A according to the embodiment.

Referring to FIGS. 1A and 1B, a display device having a touch screen according to an embodiment includes a touch screen panel 120, a window 150 that covers the touch screen panel 120, an upper resin layer 114 that joins the touch screen panel 120 and the window 150 together, and an upper dam 134 formed on a front surface F of the touch screen panel 120 to prevent the flow of the upper resin layer 114.

The touch screen panel 120 allows a user to input information to a display panel (not shown) therethrough. The touch screen panel 120 may be defined by an active area A/A and a non-active area NA formed at the outside of the active area A/A. The active area A/A is a central portion of the touch screen panel 120 in which an image of the display panel (not shown) is displayed on the display panel. The non-active area N/A is an edge circumference of the active area A/A in which electrode lines (not shown) are formed, and corresponds to a light-shielding pattern 152 of the window 150.

In this embodiment, the touch screen panel 120 may be any type of touch screen panels, including capacitive overlay, resistive overlay, infrared beam, integral strain gauge, surface acoustic wave, piezo electric touch screen panels, and the like.

The window 150 is joined together with the touch screen panel 120 on the front surface F of the touch screen panel 120. The window 150 covers the touch screen panel 120 in a direction in which an image is displayed. The window 150 may be made of a transparent material, e.g., glass or plastic.

The window 150 may also be defined by an active area A/A and a non-active area N/A. The active area A/A is a central portion corresponding to the touch screen panel 120, and the non-active area N/A is an edge circumference of the touch screen panel 120. The light-shielding pattern 152 is formed in the non-active layer N/A of the window 150.

The light-shielding pattern 152 shields unnecessary light and to cover a portion at which no image is displayed. To this end, the light-shielding pattern 152 is black or opaque and completely covers the non-active area N/A of the touch screen panel 120.

The touch screen panel 120 and the window 150 are joined together by the upper resin layer 114, i.e., the upper resin layer 114 serves as an adhesive layer that allows the window 150 to be fixed to the touch screen panel 120. The upper resin layer 114 is formed in the active area A/A on the front surface F of the touch screen panel 120. In this instance, the upper resin layer 114 protects the touch screen panel by sufficiently covering the active area A/A of the touch screen panel 120, and may be formed up to the non-active area N/A of the touch screen panel 120.

Since the upper resin layer 114 has relatively excellent elasticity, it is possible to enhance the mechanical stability and reliability of the display device. That is, the upper resin layer 114 can protect the display panel from external impact.

The upper resin layer 114 may be made of a photo-setting resin or thermosetting resin having high transmittance and adhesive performance. Since the upper resin layer 114 is formed in a liquid state, the upper dam 134 is formed in the non-active area N/A on the front surface F of the touch screen panel 120 so as to restrict the flow of the upper resin layer 114.

The upper dam 134 is formed along the edge circumference that is the non-active area N/A on the front surface F of the touch screen panel 120. The upper dam 134 may be formed along the side circumference of the upper resin layer 114.

The upper dam 134 is formed along the non-active area N/A on the front surface F of the touch screen panel 120, so that it is possible to prevent the liquefied upper resin layer 114 from flowing down to the outside of the touch screen panel 120. Further, it is possible to prevent a failure due to the excessive or deficient application of the upper resin layer 114, thereby enhancing adhesion efficiency.

The upper dam 134 may be formed of glue or silicon with a viscosity of at least 10000 cps, so that it is possible to easily form the upper dam 134 on the front surface F of the touch screen panel 120 and to enhance the adhesion between the touch screen panel 120 and the window 150.

The final height H' of the upper dam 134 in the state that the touch screen panel 120 having the upper dam 134 formed thereon is joined together with the window 150 may be identical to the height of the upper resin layer 114. On the other hand, the initial height of the upper dam 134 in the state before the touch screen panel 120 having the upper dam 134 formed thereon is joined together with the window 150 may be higher than the height of the upper resin layer 114.

In order to insure there is no step difference between the upper dam 134 and the upper resin layer 114 when pressurization is performed with respect to the touch screen panel 120 and the window 150, the height of the upper dam 134 may be higher than that of the upper resin 114, i.e., in the state that the touch screen panel 120 is joined together with the window 150. For example, assuming that the height of the upper resin layer 114 is 0.2 mm, the initial height of the upper dam 134 in the state before the touch screen panel 120 having the upper dam 134 formed thereon is joined together with the window 150 may be at least 0.3 mm, depending on the viscosity of the material used to form the upper dam.

If there is a step difference between the upper dam 134 and the upper resin 114, the adhesion between the touch screen panel 120 and the window 150 may not be sufficiently performed. However, in this embodiment, there is no step difference between the upper dam 134 and the upper resin layer 114. Thus, adhesion between the touch screen panel 120 and the window 150 may be improved.

Hereinafter, a manufacturing method of the display device having the touch screen panel according to this embodiment will be described.

Figure 2A:
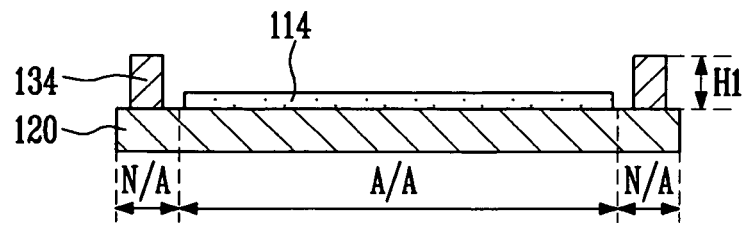
FIGS. 2A to 2C are sectional views illustrating stages in a manufacturing method of the display device having the touch screen panel shown in FIG. 1A according to an embodiment.

Referring to FIG. 2A, the touch screen panel 120 defined by an active area A/A and a non-active area N/A is provided, and the upper dam 134 is formed along the non-active area N/A on the front surface F of the touch screen panel 120. Then, the upper resin layer 114 is formed in the active area A/A.

The upper dam 134 may be formed of glue or silicon with a viscosity of at least 10000 cps, so that it is possible to easily form the upper dam 134 on the front surface F of the touch screen panel 120.

The upper resin layer 114 may be made of a photo-setting resin or thermosetting resin having high transmittance and adhesive performance. The initial height H1 of the upper dam 134 may be higher than the height of the upper resin layer 114. For example, assuming that the final height of the upper resin layer 114 is 0.2 mm, the initial height H1 of the upper dam 134 may be set to be at least 0.3 mm.

Figure 2B:
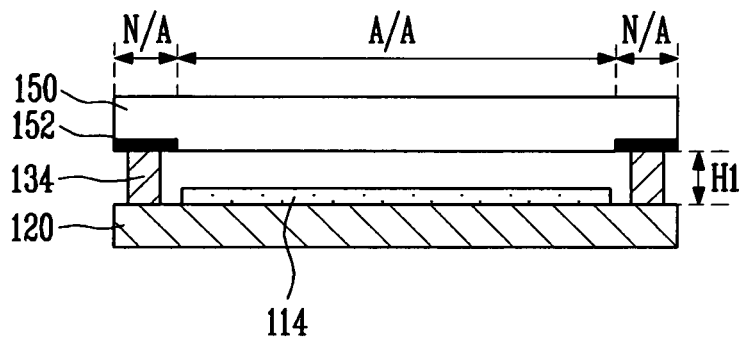

Referring to FIG. 2B, the window 150 facing the front surface F of the touch screen panel 120 is provided. In this instance, the window 150 may also be defined by an active area A/A and a non-active area N/A. The active area A/A is a central portion corresponding to the touch screen panel 120, and the non-active area N/A is an edge circumference of the touch screen panel 120.

A light-shielding pattern 152 is formed in the non-active area N/A of the window 150, and the window 150 is aligned so that the upper dam 134 is disposed at a position corresponding to the light-shielding pattern 152.

Figure 2C:
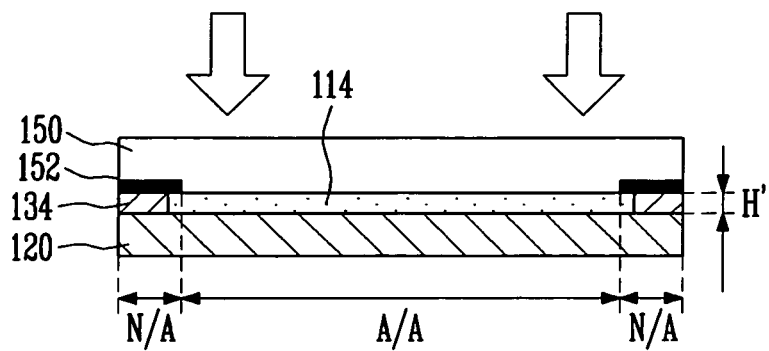

Referring to FIG. 2C, the front surface F of the touch screen panel 120 and the window 150 are joined together by applying pressure downward to the window 150. In this instance, the liquefied upper resin layer 114 is penetrated into the non-active area N/A by the application of the pressure, but the liquefied upper resin layer 114 is restricted from flowing down to the outside of the touch screen panel 120 by the upper dam 134.

When pressure is applied downward to the window 150, i.e., in the state that the touch screen panel 120 and the window 150 are joined together, the final height H' of the upper dam 134 becomes identical to the height of the upper resin layer 114 by the application of the pressure. Thus, there is no step difference between the upper dam 134 and the upper resin layer 114 in the final structure.

If there is a step difference between the upper dam 134 and the upper resin layer 114, sufficient adhesion may not be made between the touch screen panel 120 and the window 150. However, in this embodiment, there is no step difference between the upper dam 134 and the upper resin layer 114. Thus, adhesion between the touch screen panel 120 and the window 150 is enhanced.

Furthermore, since the liquefied upper resin layer 114 is prevented from flowing down to the outside of the touch screen panel 120 by the upper dam 134 formed along the non-active area on the front surface F of the touch screen panel 120, the upper resin layer 114 is sufficiently applied, so that it is possible to prevent a failure due to excessive or deficient application of the upper resin layer 114, thereby enhancing adhesion efficiency.

Figure 3A:
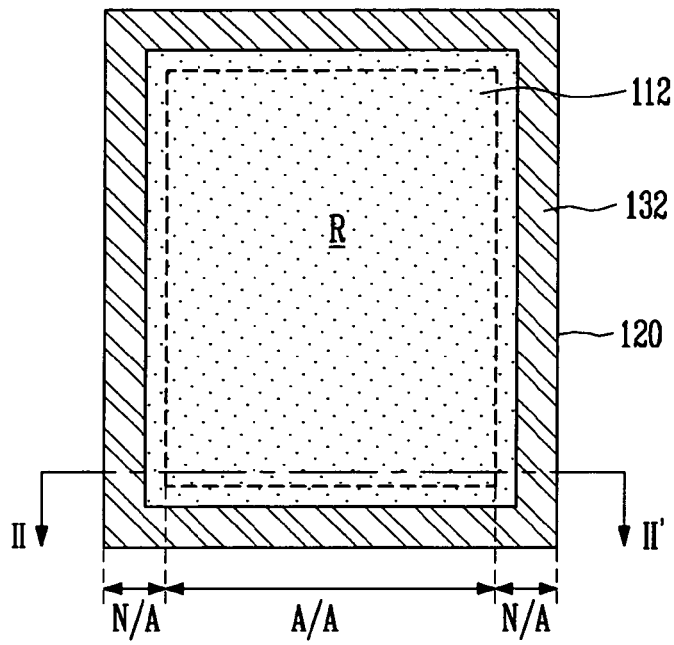
FIG. 3A is a plan view showing a bottom of a touch screen panel according to an embodiment.
Figure 3B:
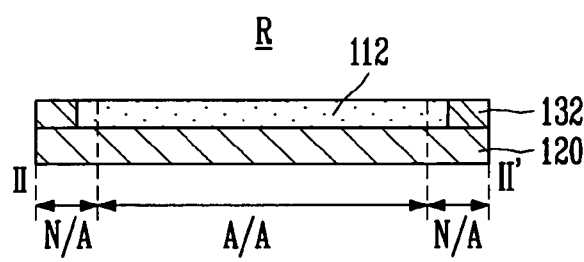
FIG. 3B is a sectional view of the touch screen panel taken along line II-II' of FIG. 3A according to an embodiment.
Figure 3C:
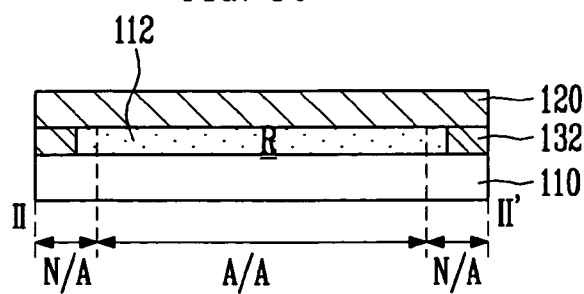
FIG. 3C is a sectional view of a display device having the touch screen panel shown in FIG. 3A according to an embodiment.

Referring to FIGS. 3A to 3C, a display device having a touch screen panel according to another embodiment includes the touch screen panel 120, a display panel 110 that displays an image in response to a signal input through the touch screen panel 120, a lower resin layer 112 that allows the touch screen panel 120 and the display panel 110 to be joined together therethrough, and a lower dam 132 formed on a rear surface R of the touch screen panel 120 to prevent the flow of the lower resin layer 112.

Since the function and operation of the touch screen panel 120 according to this embodiment are identical to those of the touch screen panel according to the aforementioned embodiment, their descriptions will be omitted.

The display panel 110 is joined with the touch screen panel 120 on the rear surface R of the touch screen panel 120. The display panel 110 displays an image based on an input through the touch screen panel 120. Like the touch screen panel 120, the display panel 110 may be defined by an active area A/A and a non-active area N/A.

A plurality of pixels are arranged in the active area A/A of the display panel 110. The display panel 110 may be implemented various types of display panels for displaying an image, such as a liquid crystal display panel, an organic light emitting display panel, and the like.

The touch screen panel 120 and the display panel 110 are joined together by the lower resin layer 112, and the lower resin layer 112 serves as an adhesive layer that allows the touch screen panel 120 to be fixed to the display panel 110. The lower resin layer 112 is formed in an active area A/A on the rear surface R of the touch screen panel 120. In this instance, the lower resin layer 112 protects the touch screen panel by sufficiently covering the active area A/A of the touch screen panel 120, and may be formed up to a non-active area N/A of the touch screen panel 120.

Since the lower resin layer 112 has relatively excellent elasticity, it protects the touch screen panel 120, thereby enhancing the mechanical stability and reliability of the display panel 110. That is, the lower resin layer 112 can protect the display panel 110 from external impact. The lower resin layer 112 may be formed of the same material as the upper resin layer 114.

The lower resin layer 112 may be made of a photo-setting resin or thermosetting resin having high transmittance and adhesive performance. Since the lower resin layer 112 is formed in a liquid state, the lower dam 132 is formed in the non-active area N/A on the rear surface R of the touch screen panel 120 so as to prevent the flow o the lower resin layer 112.

The lower dam 132 is formed along an edge circumference of the non-active area N/A on the rear surface R of the touch screen panel 120. The lower dam 132 may be formed along a side circumference of the lower resin layer 112.

The upper dam 132 is formed along the non-active area N/A on the rear surface R of the touch screen panel 120, so that it is possible to prevent the liquefied lower resin layer 112 from flowing down to the outside of the touch screen panel 120. Further, it is possible to prevent a failure due to the excessive or deficiency application of the lower resin layer 112, thereby enhancing adhesion efficiency.

The lower dam 132 is formed of the same material as a protection film attached on the rear surface R of the touch screen panel 120 and removed. The lower dam 132 is formed of the same material as the protection film, so that it is possible to easily form the lower dam 132 without an additional process.

Hereinafter, the display device having a touch screen panel according to this embodiment will be described.

Figure 4A:
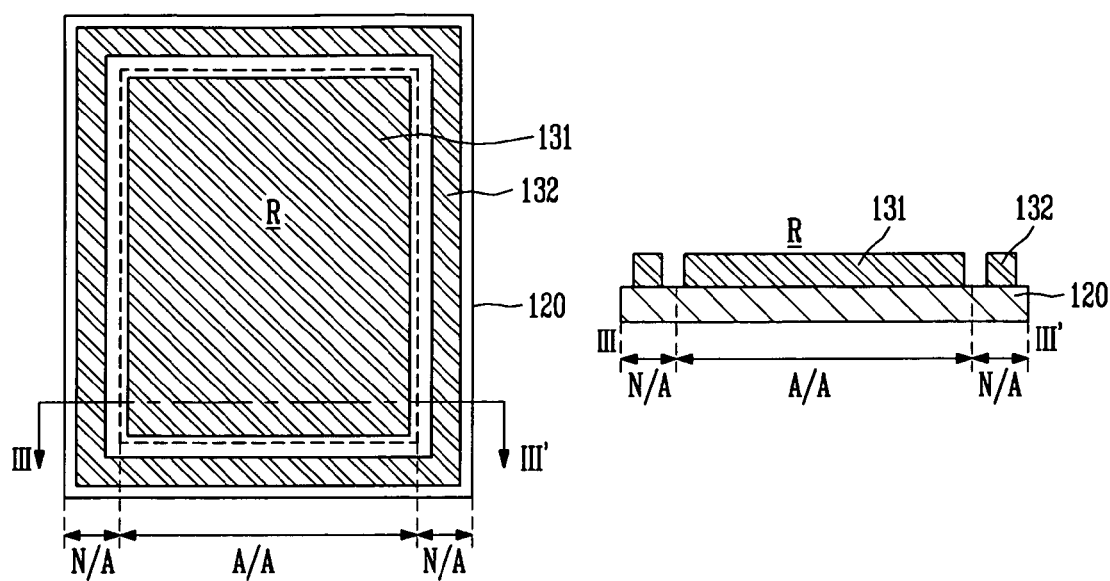
FIGS. 4A to 4E are sectional views illustrating stages in a manufacturing method of the display device having the touch screen panel shown in FIG. 3A according to an embodiment.

Referring to FIG. 4A, the touch screen panel 120 defined by an active area A/A and a non-active area N/A is provided. Then, a protection film 131 is formed in the active area A/A on the rear surface R of the touch screen panel 120, and the lower dam 132 is simultaneously formed along the non-active area N/A. The protection film 131 is a film formed to prevent scratches of sensing cells (not shown) and the like, formed in the touch screen panel 120.

The protection film 131 and the lower dam 132 may be formed of the same material using an ink screening process. The lower dam 132 may be formed using the same mask used for forming the protection film 131.

The lower dam 132 is formed of the same material as the protection film 131, so that it is possible to easily form the lower dam 132 without an additional process and equipment. The width of the lower dam 132 may be 0.2 mm.

Figure 4B:
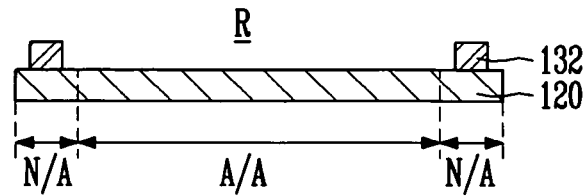

Referring to FIG. 4B, the protection film 131 formed in the active area A/A on the rear surface R of the touch screen panel 120 is removed.

Figure 4C:
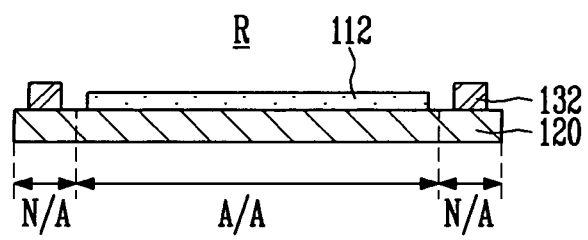

Referring to FIG. 4C, the lower resin layer 112 is formed in the active area A/A on the rear surface of the touch screen panel 120 from which the protection film is removed. The lower resin layer 112 may be made of a photo-setting resin or thermosetting resin having high transmittance and adhesive performance.

Figure 4D:
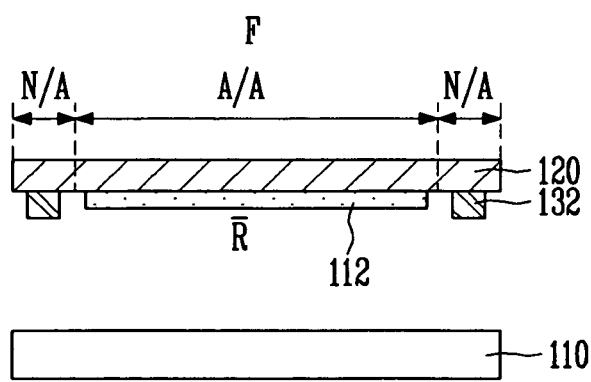

Referring to FIG. 4D, a display panel 110 is provided and aligned so that the front surface F of the touch screen panel 120 faces upward and the rear surface R of the touch screen panel 120 faces the front surface of the touch panel 110. Like the touch screen panel 120, the display panel 110 may be defined by an active area A/A and a non-active area N/A.

A plurality of pixels are arranged in the active area A/A of the display panel 110, and the display panel 110 may be implemented as various types of display panels for displaying an image, such as a liquid crystal display panel, an organic light emitting display panel, and the like.

Figure 4E:
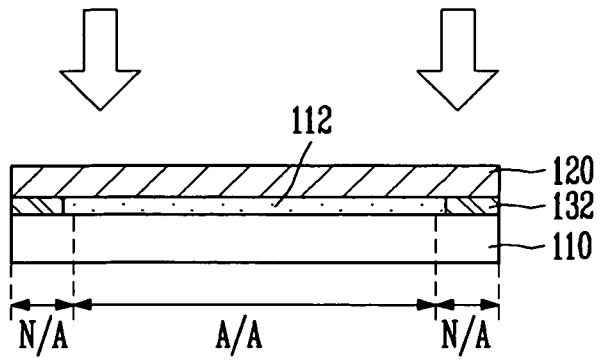

Referring to FIG. 4E, the touch screen panel 120 and the display panel 110 are joined together by applying pressure to the touch screen panel 120 in the direction of the display panel 110. In this instance, the liquefied lower resin layer 112 is penetrated into the non-active area N/A by the application of the pressure, but it is possible to prevent the lower resin layer 112 from being flowed down to the outside of the touch screen panel 120 by the lower dam 132.

Since the liquefied lower resin layer 112 is prevented from being flowed down to the outside of the touch screen panel 120 by applying the pressure to the lower dam 132 formed along the non-active area on the rear surface R of the touch screen panel 120, the lower resin layer 112 is sufficiently applied, failure due to the excessive or deficient application of the lower resin layer 112 may be prevented, thereby enhancing adhesion efficiency.

Figure 5:
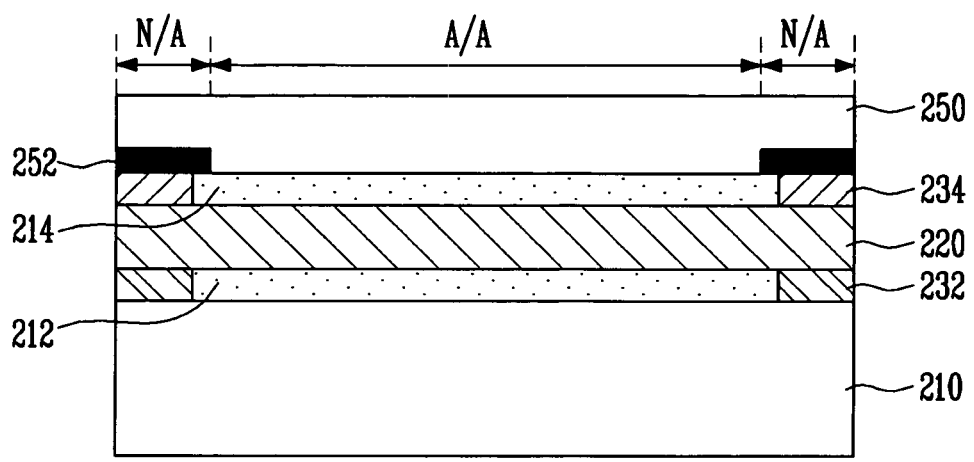
FIG. 5 is a sectional view of a display device having a touch screen panel according to an embodiment.

Referring to FIG. 5, a display device having a touch screen panel according to still another embodiment includes a touch screen panel 220 defined by an active area A/A and a non-active are N/A to sense an external input, a display panel 210 that displays an image based on the sensing of the touch screen panel 220, a window 250 that covers the touch screen panel 220, a lower resin layer 212 through which the touch screen panel 220 and the display panel 210 are joined together, and an upper resin layer 214 through which the touch screen panel 220 and the window 250 are joined together.

The lower resin layer 212 is formed on a rear surface of the touch screen panel 220, and the upper resin layer 214 is formed on a front surface of the touch screen panel 220. In this instance, a lower dam 232 may be formed in the non-active area N/A on the rear surface of the touch screen panel 220. An upper dam 234 may be formed in the non-active area N/A on the front surface of the touch screen panel 220.

The lower dam 232 is formed at the circumference of the lower resin layer 212 along a side of the lower resin layer 212, and the upper dam 234 is formed at the circumference of the upper resin layer 214 along a side of the upper resin layer 214. The lower and upper dams 232 and 234 may be made of different materials from each other.

The configuration and function of the display device having the touch screen panel according to this embodiment are identical to those of the display device having the touch screen panel according to the aforementioned embodiment, except that the lower and upper dams 232 and 234 are formed on both the surface of the touch screen panel 220, respectively. Therefore, descriptions of components identical to those in the aforementioned embodiment will be omitted.

That is, in the display device having the touch screen panel according to this embodiment, the lower and upper dams 232 and 234 are formed on both the surfaces in the non-active area N/A of the touch screen panel 220, so the liquefied lower resin layer 212 is prevented from flowing down to the outside of the touch screen panel 220. Accordingly, the lower resin layer 212 is sufficiently applied, so that it is possible to prevent an adhesive failure due to the excessive or deficient application of the lower resin layer 212, thereby enhancing the adhesion efficiency between the touch screen panel 220 and the display panel 210.

Since the liquefied upper resin layer 214 is prevented from flowing down to the outside of the touch screen panel 220, the upper resin layer 214 is sufficiently applied, so that it is possible to prevent an adhesion failure due to the excessive or deficient application of the upper resin layer 214, thereby enhancing the adhesion efficiency between the touch screen panel 220 and the display panel 210.

A manufacturing method of the display device having the touch screen panel according to this embodiment may be achieved by performing the manufacturing method of the display device having the touch screen panel according to the embodiment described with reference to FIGS. 1 to 2C and then performing the manufacturing method of the display device having the touch screen panel according to the embodiment described with reference to FIGS. 3 to 4E.

Alternatively, the manufacturing method of the display device having the touch screen panel according to this embodiment may be achieved by performing the manufacturing method of the display device having the touch screen panel according to the embodiment described with reference to FIGS. 3 and 4E and then performing the manufacturing method of the display device having the touch screen panel according to the embodiment described with reference to FIGS. 1 and 2C.

In conventional securing of a touch screen panel to a display panel and window, since the resin layer is liquefied, the resin layer may be over-applied, flowing outside between the display panel and the touch screen panel in its over-application. Also, there occurs a failure in that when the flowed resin layer is removed, a scratch occurs in the display device. On the other hand, when the resin layer is deficiently applied, there occurs an adhesion failure between the display panel and the touch screen panel or between the touch screen panel and the window.

By way of summation and review, in accordance with embodiments, by providing a dam on at least one of a front and rear surface of a touch screen panel to be joined with other elements, e.g., a display panel or a window, sufficient adhesion without overflow of the resin may be realized.

In particular, as described above, according to embodiments, an upper or lower dam is formed along an edge circumference that is a non-active area on a front or rear surface of a touch screen panel, so that it is possible to prevent a failure due to the excessive or deficient application of a resin layer, thereby enhancing the adhesion efficiency between the touch screen panel and a window.

Also, glue or silicon with a viscosity of 10000 cps or higher may be used as the upper dam, so that it is possible to easily form the upper dam and to enhance the adhesion between the touch screen panel and the window.

Also, the lower dam may be formed of the same material as a protection film for protecting electrode patterns on the rear surface of the touch screen panel, so that it is possible to easily form the lower dam without an additional process.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device having a touch screen, comprising:
   a touch screen panel defined by an active area in which an external input is sensed and a non-active area outside the active area;
   a display panel that displays an image based on inputs to the touch screen panel;
   a window that covers the touch screen panel;
   a lower resin layer between a rear surface of the touch screen panel and the display panel, the lower resin layer joining the touch screen panel and the display panel together;
   an upper resin layer between a front surface of the touch screen panel and the window, the upper resin layer joining the touch screen panel and the window together; and
   a lower dam or an upper dam only in the non-active area of the touch screen panel along a side circumference of the lower or upper resin layer, respectively, and surrounding the lower resin layer or the upper resin layer, respectively,
   wherein the lower dam or the upper dam directly contacts the touch screen panel, and a height of the upper dam is identical to a height of the upper resin layer or a height of the lower dam is identical to a height of the lower resin layer.

2. The display device according to claim 1, wherein the upper dam is formed on the front surface of the non-active area in the touch screen panel along the side circumference of the upper resin layer to restrict flow of the upper resin layer.

3. The display device according to claim 2, wherein the upper dam is formed of glue or silicon with a viscosity of 10000 cps or higher.

4. The display device according to claim 1, wherein the window comprises a light-shielding pattern corresponding to the non-active area, and the upper dam is disposed to correspond to the light-shielding pattern.

5. The display device according to claim 1, wherein the lower dam is formed on the rear surface of the non-active area in the touch screen panel along the side circumference of the lower resin layer so as to restrict flow of the lower resin layer.

6. The display device according to claim 5, wherein the width of the lower dam is 0.2 mm.

7. The display device according to claim 1, comprising both the upper dam and the lower dam, wherein the upper and lower dams are made of different materials from each other.

8. The display device according to claim 1, comprising both the upper dam and the lower dam, wherein the lower and upper resin layers are made of the same material.

9. The display device according to claim 1, wherein the lower dam or the upper dam completely surrounds the lower resin layer or the upper resin layer, respectively.

10. A manufacturing method of a display device having a touch screen, the method comprising:
    preparing a touch screen panel defined by an active area and a non-active area formed at the outside of the active area;
    forming a protection film in the active area on a rear surface of the touch screen panel and forming a lower dam only in the non-active area on the rear surface of the touch screen panel;
    removing the protection film formed in the active area;
    forming a lower resin layer on the rear surface of the active area when the protection film is removed; and
    aligning the touch screen panel and a display panel so that the rear surface of the touch screen panel faces a front surface of the display panel, thereby joining the touch screen panel and the display panel together,
    wherein the lower dam is formed directly on the rear surface of the touch screen panel and surrounds the lower resin layer, and a height of the lower dam is identical to a height of the lower resin layer or a height of the upper dam is identical to a height of the upper resin layer.

11. The method according to claim 10, wherein the lower dam is made of the same material as the protection film.

12. The method according to claim 10, wherein the width of the lower dam is 0.2 mm.

13. The method according to claim 10, wherein the lower dam and the protection film are formed through an ink screening process.

14. The method according to claim 10, further comprising:
    forming an upper dam in the non-active area on a front surface of the touch screen panel;
    forming an upper resin layer in the active area on the front surface of the touch screen panel; and aligning the touch screen panel and a window so that the front surface of the touch screen panel faces the window, thereby joining the touch screen panel and the window together.

15. The method according to claim 14, wherein the upper dam is formed of glue or silicon with a viscosity of 10000 cps or higher.

16. The method according to claim 14, wherein the upper dam is disposed to a light-shielding pattern formed in a non-active area of the window.

17. The method according to claim 14, wherein an initial height of the upper dam is higher than a height of the upper resin layer.

18. The method according to claim 14, wherein a final height of the upper dam is identical to a height of the upper resin layer.

19. A manufacturing method of a display device having a touch screen, the method comprising:
   preparing a touch screen panel defined by an active area and a non-active area formed at the outside of the active area;
   forming an upper dam only in the non-active area on a front surface of the touch screen panel;
   forming an upper resin layer in the active area on the front surface of the touch screen panel;
   aligning the touch screen panel and a window so that the front surface of the touch screen panel faces the window, thereby joining the touch screen panel and the window together; and
   forming a lower resin layer in the active area on the rear surface of the touch screen panel; and
   aligning the touch screen panel and a display panel so that the rear surface of the touch screen panel faces a front surface of the display panel, thereby joining the touch screen panel and the display panel together,
   wherein the upper dam is formed directly on the front surface of the touch screen panel and surrounds the upper resin layer, wherein a height of the upper dam is identical to a height of the upper resin layer, and a height of the lower dam is identical to a height of the lower resin layer.

* * * * *